(12) United States Patent
Battat et al.

(10) Patent No.: US 7,680,879 B2
(45) Date of Patent: Mar. 16, 2010

(54) METHOD AND APPARATUS FOR MAINTAINING DATA INTEGRITY ACROSS DISTRIBUTED COMPUTER SYSTEMS

(75) Inventors: Reuven Battat, Stony Brook, NY (US); Michael Her, North Babylon, NY (US); Chandrasekha Sundaresh, Hicksville, NY (US); Anders Vinberg, Plandome Manor, NY (US); Sidney Wang, Nesconset, NY (US)

(73) Assignee: Computer Associates Think, Inc., Islandia, NY (US)

( * ) Notice: Subject to any disclaimer, the term of this patent is extended or adjusted under 35 U.S.C. 154(b) by 450 days.

(21) Appl. No.: 11/359,970

(22) Filed: Feb. 21, 2006

(65) Prior Publication Data

US 2006/0143239 A1    Jun. 29, 2006

Related U.S. Application Data

(63) Continuation of application No. 09/559,237, filed on Apr. 26, 2000, now Pat. No. 7,003,587, which is a continuation-in-part of application No. 09/408,213, filed on Sep. 27, 1999, now Pat. No. 6,289,380, which is a continuation of application No. 08/892,919, filed on Jul. 15, 1997, now Pat. No. 5,958,012.

(60) Provisional application No. 60/131,019, filed on Apr. 26, 1999, provisional application No. 60/021,980, filed on Jul. 18, 1996.

(51) Int. Cl.
*G06F 15/16* (2006.01)
*G06F 7/00* (2006.01)

(52) U.S. Cl. .................................. 709/203; 707/103 R

(58) Field of Classification Search .................. 709/203, 709/219; 707/103 R
See application file for complete search history.

(56) References Cited

U.S. PATENT DOCUMENTS

| 2,485,343 A | 10/1949 | Zuschlag .................... 177/351 |
| 3,599,033 A | 8/1971 | Stettiner et al. ............... 315/18 |

(Continued)

FOREIGN PATENT DOCUMENTS

| EP | 0 547 993 A2 | 6/1993 |
| EP | 0 936 597 A1 | 8/1999 |

(Continued)

OTHER PUBLICATIONS

Computer Dictionary, 3rd ed., Microsoft Press, p. 359, 1997.

(Continued)

*Primary Examiner*—Larry D Donaghue
(74) *Attorney, Agent, or Firm*—Baker Botts L.L.P.

(57) ABSTRACT

A method and apparatus are generally disclosed for maintaining data integrity across distributed computer systems. In one embodiment, the method of the invention includes the step of transmitting an object from a server application to a client application. The method also includes the step of transmitting an object state from the server application to the client application. The method further includes the steps of synchronizing the object and object state between the server application and the client application, and updating the object by invoking a server application method after the step of synchronizing. An apparatus and article of manufacture for carrying out the steps of the method are also disclosed.

21 Claims, 2 Drawing Sheets

U.S. PATENT DOCUMENTS

| | | | |
|---|---|---|---|
| 4,464,543 A | 8/1984 | Kline et al. | 379/224 |
| 4,626,892 A | 12/1986 | Nortrup et al. | 358/21 R |
| 4,665,494 A | 5/1987 | Tanaka et al. | 364/485 |
| 4,881,197 A | 11/1989 | Fischer | 715/530 |
| 4,937,037 A | 6/1990 | Griffiths et al. | 345/36 |
| 4,965,752 A | 10/1990 | Keith | 345/427 |
| 4,977,390 A | 12/1990 | Saylor et al. | 340/521 |
| 5,233,687 A | 8/1993 | Henderson, Jr. et al. | 715/804 |
| 5,261,044 A | 11/1993 | Dev et al. | 715/855 |
| 5,271,058 A | 12/1993 | Andrews et al. | 379/265.11 |
| 5,271,063 A | 12/1993 | Dev et al. | 715/853 |
| 5,295,244 A | 3/1994 | Dev et al. | 715/853 |
| 5,303,388 A | 4/1994 | Kreitman et al. | 395/159 |
| 5,353,399 A | 10/1994 | Kuwamoto et al. | 715/736 |
| 5,367,670 A | 11/1994 | Ward et al. | 714/47 |
| 5,394,522 A | 2/1995 | Sanchez-Frank et al. | 715/735 |
| 5,408,218 A | 4/1995 | Svedberg et al. | 340/507 |
| 5,440,688 A | 8/1995 | Nishida | 714/4 |
| 5,444,849 A | 8/1995 | Farrand et al. | 709/237 |
| 5,483,631 A | 1/1996 | Nagai et al. | 715/853 |
| 5,486,457 A | 1/1996 | Butler et al. | 435/7.2 |
| 5,495,607 A | 2/1996 | Pisello et al. | 395/600 |
| 5,499,371 A * | 3/1996 | Henninger et al. | 717/108 |
| 5,500,934 A | 3/1996 | Austin et al. | 715/853 |
| 5,504,921 A | 4/1996 | Dev et al. | 395/800 |
| 5,509,123 A | 4/1996 | Dobbins et al. | 709/243 |
| 5,535,403 A | 7/1996 | Li et al. | 715/853 |
| 5,586,230 A | 12/1996 | Leon et al. | 395/120 |
| 5,586,254 A | 12/1996 | Kondo et al. | 714/25 |
| 5,586,255 A | 12/1996 | Tanaka et al. | 709/223 |
| 5,631,825 A | 5/1997 | van Weele et al. | 700/83 |
| 5,634,122 A | 5/1997 | Loucks et al. | 707/8 |
| 5,650,814 A | 7/1997 | Florent et al. | 348/39 |
| 5,655,081 A | 8/1997 | Bonnell et al. | 709/202 |
| 5,666,477 A | 9/1997 | Maeda | 345/440 |
| 5,671,381 A | 9/1997 | Strasnick et al. | 715/848 |
| 5,682,487 A | 10/1997 | Thomson | 715/800 |
| 5,684,967 A | 11/1997 | McKenna et al. | 715/853 |
| 5,694,598 A * | 12/1997 | Durand et al. | 707/103 R |
| 5,696,486 A | 12/1997 | Poliquin et al. | 340/506 |
| 5,696,892 A | 12/1997 | Redmann et al. | 395/125 |
| 5,699,403 A | 12/1997 | Ronnen | 379/32 |
| 5,745,692 A | 4/1998 | Lohmann, II et al. | 395/200.53 |
| 5,748,098 A | 5/1998 | Grace | 370/242 |
| 5,748,884 A | 5/1998 | Royce et al. | 714/57 |
| 5,751,965 A | 5/1998 | Mayo et al. | 709/224 |
| 5,761,502 A | 6/1998 | Jacobs | 395/614 |
| 5,768,501 A | 6/1998 | Lewis | 714/48 |
| 5,774,669 A | 6/1998 | George et al. | 709/224 |
| 5,787,252 A | 7/1998 | Schettler et al. | 709/224 |
| 5,793,974 A | 8/1998 | Messinger | 709/224 |
| 5,796,951 A | 8/1998 | Hamner et al. | 709/223 |
| 5,801,707 A | 9/1998 | Rolnik et al. | 715/853 |
| 5,802,383 A | 9/1998 | Li et al. | 345/420 |
| 5,805,819 A | 9/1998 | Chin et al. | 709/224 |
| 5,809,265 A | 9/1998 | Blair et al. | 715/764 |
| 5,812,750 A | 9/1998 | Dev et al. | 714/4 |
| 5,832,503 A | 11/1998 | Malik et al. | 709/223 |
| 5,857,190 A | 1/1999 | Brown | 707/10 |
| 5,867,650 A | 2/1999 | Osterman | 395/200.33 |
| 5,870,763 A | 2/1999 | Lomet | 707/202 |
| 5,872,911 A | 2/1999 | Berg | 395/183.19 |
| 5,872,912 A | 2/1999 | Brownmiller et al. | 395/184.01 |
| 5,933,601 A | 8/1999 | Fanshier et al. | 709/223 |
| 5,941,996 A | 8/1999 | Smith et al. | 714/47 |
| 5,948,060 A | 9/1999 | Gregg et al. | 709/212 |
| 5,956,028 A | 9/1999 | Matsui et al. | 715/757 |
| 5,958,012 A | 9/1999 | Battat et al. | 709/224 |
| 5,963,886 A | 10/1999 | Candy et al. | 702/61 |
| 5,987,376 A | 11/1999 | Olson et al. | 701/201 |
| 5,987,506 A | 11/1999 | Carter et al. | 709/213 |
| 6,000,045 A | 12/1999 | Lewis | 714/47 |
| 6,006,016 A | 12/1999 | Faigon et al. | 395/185.01 |
| 6,008,820 A | 12/1999 | Chauvin et al. | 345/502 |
| 6,011,838 A | 1/2000 | Cox | 379/112.06 |
| 6,012,984 A | 1/2000 | Roseman | 463/42 |
| 6,021,262 A | 2/2000 | Cote et al. | 714/48 |
| 6,029,177 A | 2/2000 | Sadiq et al. | 707/201 |
| 6,035,324 A | 3/2000 | Chang et al. | 709/203 |
| 6,049,828 A | 4/2000 | Dev et al. | 709/224 |
| 6,052,722 A | 4/2000 | Taghadoss | 709/223 |
| 6,057,757 A | 5/2000 | Arrowsmith et al. | 340/506 |
| 6,058,494 A | 5/2000 | Gold et al. | 714/42 |
| 6,061,714 A | 5/2000 | Housel, III et al. | 709/203 |
| 6,070,184 A | 5/2000 | Blount et al. | 709/200 |
| 6,073,099 A | 6/2000 | Sabourin et al. | 704/256.6 |
| 6,085,256 A | 7/2000 | Kitano et al. | 719/315 |
| 6,094,195 A | 7/2000 | Clark et al. | 715/839 |
| 6,108,782 A | 8/2000 | Fletcher et al. | 713/153 |
| 6,112,015 A | 8/2000 | Planas et al. | 709/223 |
| 6,125,390 A | 9/2000 | Touboul | 709/223 |
| 6,131,118 A | 10/2000 | Stupek, Jr. et al. | 709/223 |
| 6,141,777 A | 10/2000 | Cutrell et al. | 714/47 |
| 6,154,212 A | 11/2000 | Eick et al. | 715/848 |
| 6,154,849 A | 11/2000 | Xia | 714/4 |
| 6,161,082 A | 12/2000 | Goldberg et al. | 704/3 |
| 6,163,776 A * | 12/2000 | Periwal | 707/4 |
| 6,167,448 A | 12/2000 | Hemphill et al. | 709/224 |
| 6,185,613 B1 | 2/2001 | Lawson et al. | 709/224 |
| 6,192,365 B1 | 2/2001 | Draper et al. | 707/101 |
| 6,199,068 B1 * | 3/2001 | Carpenter | 707/100 |
| 6,202,085 B1 | 3/2001 | Benson et al. | 709/205 |
| 6,209,033 B1 | 3/2001 | Datta et al. | 709/224 |
| 6,222,547 B1 | 4/2001 | Schwuttke et al. | 345/419 |
| 6,237,006 B1 | 5/2001 | Weinberg et al. | 707/103 R |
| 6,260,158 B1 | 7/2001 | Purcell et al. | 714/10 |
| 6,271,845 B1 | 8/2001 | Richardson | 715/764 |
| 6,288,650 B2 | 9/2001 | Chavand | 340/679 |
| 6,289,320 B1 * | 9/2001 | Drummond et al. | 705/35 |
| 6,298,378 B1 | 10/2001 | Angal et al. | 709/223 |
| 6,366,284 B1 | 4/2002 | McDonald | 345/440 |
| 6,373,505 B1 | 4/2002 | Bellamy et al. | 715/772 |
| 6,374,256 B1 * | 4/2002 | Ng et al. | 707/103 R |
| 6,374,293 B1 | 4/2002 | Dev et al. | 709/220 |
| 6,404,444 B1 | 6/2002 | Johnston et al. | 715/839 |
| 6,421,707 B1 | 7/2002 | Miller et al. | 709/206 |
| 6,456,306 B1 | 9/2002 | Chin et al. | 345/810 |
| 6,546,425 B1 | 4/2003 | Hanson et al. | 709/227 |
| 6,577,323 B1 | 6/2003 | Jamieson et al. | 715/700 |
| 6,587,108 B1 | 7/2003 | Guerlain et al. | 345/440 |
| 6,603,396 B2 | 8/2003 | Lewis et al. | 340/506 |
| 6,614,433 B1 | 9/2003 | Watts | 345/440 |
| 6,639,614 B1 | 10/2003 | Kosslyn et al. | 715/837 |
| 6,661,434 B1 | 12/2003 | MacPhail | 715/772 |
| 6,704,874 B1 | 3/2004 | Porras et al. | 726/22 |
| 6,707,795 B1 | 3/2004 | Noorhosseini et al. | 370/242 |
| 6,711,154 B1 | 3/2004 | O'Neal | 370/352 |
| 6,732,170 B2 | 5/2004 | Miyake et al. | 709/223 |
| 6,738,809 B1 | 5/2004 | Brisebois et al. | 709/224 |
| 6,744,446 B1 | 6/2004 | Bass et al. | 715/734 |
| 2001/0042118 A1 | 11/2001 | Miyake et al. | 709/223 |
| 2001/0044840 A1 | 11/2001 | Carleton | 709/223 |
| 2003/0046390 A1 | 3/2003 | Ball et al. | 709/224 |
| 2003/0069952 A1 | 4/2003 | Tams et al. | 709/223 |
| 2004/0210469 A1 | 10/2004 | Jones et al. | 705/8 |
| 2005/0078692 A1 | 4/2005 | Gregson | 370/401 |

FOREIGN PATENT DOCUMENTS

| | | |
|---|---|---|
| WO | WO 95/27249 | 10/1995 |
| WO | WO 97/04389 | 2/1997 |
| WO | WO 99/15950 | 4/1999 |

OTHER PUBLICATIONS

Microsoft Press Computer Dictionary, p. 92, 1997.

Dupuy, et al., *Netmate; A Network Management Environment*, IEEE Network Magazine, pp. 35-43, Mar. 1991.

Lazar, et al., *Exploiting Virtual Reality for Network Management*, Singapore ICCS/ISITA, IEEE, pp. 979-983, 1992.

Feiner, et al., *A virtual World for Network Management*, Proc. VRAIS '93, Seattle, WA, IEEE, pp. 55-61, Oct. 18-22, 1993.

Crutcher, et al., *Management and Control for Giant Gigabit Networks*, IEEE Network, pp. 62-71, Nov. 1993.

Crutcher, et al., *Managing Networks Through a Virtual World*, IEEE Parallel & Distributed Technology, pp. 4-13, 1995.

Stafford, J., *Client-Server's Missing Link (Applications Management)*, VARbusiness, vol. 12, No. 2, pp. 133-138, Feb. 1, 1996.

Chan, et al., *A Platform for Real-Time Visualization and Interactive Simulation of Large Multimedia Networks*, Proceedings of the $4^{th}$ IEEE International Workshop on Parallel and Distributed Real-Time Systems, pp. 1-7, Apr. 1996.

Lamm, et al., *Real-Time Geographic Visualization of World Wide Web Traffic*, Fifth International World Wide Web Conference, pp. 1-17, May 6-10, 1996.

*Microsoft Press Computer Dictionary*, p. 92, 1997.

*Computer Dictionary*, $3^{rd}$ ed., Microsoft Press, p. 359, 1997.

Computer Associates, *Unicenter Console Management for Open VMS, Enterprise Management*, 7 pages, 2002.

Australian Patent Office Communication for Application No. 2002240575, 2 pages, Feb. 2, 2007.

European Patent Office Communication for Application No. 02713722.3—2005, 5 pages, Jun. 16, 2006.

European Patent Office Communication pursuant to Article 96(2) EPC for Application No. 02 715 024.2-1225, 8 pages, Jun. 27, 2006.

European Patent Office Communication pursuant to Article 96(2) EPC for Application No. 02 706 491.4-1225, 5 pages, Oct. 23, 2006.

European Patent Office Communication pursuant to Article 96(2) EPC for Application No. 01 983 162. 7-2224, 5 pages, Aug. 7, 2007.

PCT International Preliminary Examination Report for Application No. PCT/US02/06444, 5 pages, Jan. 22, 2003.

USPTO Office Action Summary, for U.S. Appl. No. 10/091,067, filed Mar. 4, 2002, 18 pages, Jul. 5, 2007.

USPTO Office Action Summary for U.S. Appl. No. 09/949,101, filed Sep. 7, 2001, 19 pages, Aug. 20, 2007.

Israeli Office Action; 16669/03; 1 page, Dec. 18, 2007.

USPTO Office Action for U.S. Appl. No. 09/949,101, filed Sep. 7, 2001 in the name of Reuven Battat; 21 pages, Feb. 5, 2008.

USPTO Office Action for U.S. Appl. No. 10/091,067, filed Mar. 4, 2002, inventor Anders Vinberg et al.; 29 pages, Dec. 31, 2008.

USPTO Office Action for U.S. Appl. No. 10/091,065, filed Mar. 4, 2002, inventor Anders Vinberg et al.; 21 pages, Jul. 29, 2008.

Australian Government, Examiner's first report on patent application No. 2007202675, 2 pages, Dec. 12, 2008.

Pribble et al., "Tools for Better Network Management," AT&T Technology, vol. 6, No. 2, XP-000259689, pp. 1-8, 1991.

Communication Pursuant to 94(3) EPC, EPO, Application No. 00 928 570.1-2211, Ref. No. GAW/KT/J43848EP, 7 pages, Dec. 5, 2009.

Little et al., "Maintaining Information about Persistent Replicated Objects in a Distributed System," Department of Computing Science, IEEE, pp. 491-498, 1993.

Franklin et al., "Transactional Client-Server Cache Consistency: Alternatives and Performance," ACM Transactions on Database Systems, vol. 22, No. 3, XP-002247935, pp. 315-363 Sep. 1997.

Communication pursuant to 94(3) EPC, Application No. 00 926 480.5-2224, Ref No. GAW/KT/J43847EP, 6 pages Aug. 18, 2009.

\* cited by examiner

METHOD AND APPARATUS FOR MAINTAINING DATA INTEGRITY ACROSS DISTRIBUTED COMPUTER SYSTEMS

CROSS-REFERENCES TO RELATED APPLICATIONS, IF ANY

This application is a continuation of U.S. Ser. No. 09/559,237 filed Apr. 26, 2000, now U.S. Pat. No. 7,003,587, which claims benefit of U.S. Provisional Patent Application Ser. No. 60/131,019 filed Apr. 26, 1999, which is a Continuation-in-Part of U.S. Ser. No. 09/408,213 filed Sep. 27, 1999, now U.S. Pat. No. 6,289,380, which is a continuation of U.S. Ser. No. 08/829,919 filed Jul. 15, 1997, now U.S. Pat. No. 5,958,012 which claims benefit of U.S. Provisional Application Ser. No. 60/021,980 filed Jul. 18, 1996. Each of these related applications are incorporated by reference, herein.

STATEMENT AS TO RIGHTS TO INVENTIONS MADE UNDER FEDERALLY SPONSORED RESEARCH AND DEVELOPMENT, IF ANY

This patent is not based upon any federally sponsored research and development.

TECHNICAL FIELD OF THE INVENTION

Applicants' system is in the field of software-implemented methods, systems and articles of manufacture for maintaining data integrity across distributed computer systems.

BACKGROUND AND SUMMARY OF THE INVENTION

Several different technologies presently exist to support information processing in distributed environments. Each such technology has been designed to meet a specific purpose. Remote Procedure Call systems, for example, permit a program running on one computer to invoke a function on another computer. Object Request Brokers provide a similar service, but with some minor variations that follow the conventions of object technology. Database access systems let a program retrieve data from a database on another computer. Messaging systems let one program communicate with another on a remote computer, sometimes storing the message if necessary and forwarding it when communication can be established. Publish and subscribe systems permit one program to broadcast a message, and only those systems that have subscribed to that message receive it. Several other technologies exist in this area.

In many cases, the communications technology provides the same services when communicating with another program on the same computer, or one on another computer; in some cases, even when communicating with a service within the same program. In other cases, different techniques must be used when communicating in the different configurations.

However, the current state of the art imposes some practical problems. No existing service meets all of the requirements of modern distributed applications. The different services are rarely integrated, which means that a program that needs some combination of services has to do a lot of work to combine them. In practice, it is very difficult to do this, without introducing subtle errors that undermine the integrity of the data. In addition, the closed nature of many of these services often make it impractical for a developer to combine them. For example, Microsoft Corporation provides an ORB service called COM that is based on conventional, connection-based communication. Microsoft also provides a store-and-forward messaging system called MSMQ. However, COM does not support the use of MSMQ for communication, to permit asynchronous invocation of services.

State Shipping Technology

Object Request Brokers

There are a number of systems in the present art that provide for invocation of services in a remote server. These are often called Remote Procedure Call (RPC) services. When they are based on an object model, they are called Object Request Brokers. Such systems are fundamentally flawed in that they maintain the state of the objects on the server. When constructing a distributed system where it is desirable for client-side programs to reference the individual properties that in aggregate constitute the state of a server-side object, developers generally choose between two options, neither of which is attractive.

The object server can expose the properties individually, using property retrieval methods of the type getCurrentBalance and property setting methods like setCurrentBalance. But this can be very inefficient: to retrieve a complete picture of an object's state, the client program would have to make a large number of requests. Modern network systems and database management systems are not designed to handle large numbers of small requests very efficiently: the overhead and latency of both networks and databases would make this very costly.

The object server can expose a getState method that returns a data structure that contains the entire state. This is more efficient, since the entire state is shipped to the client in one conversation, but it breaks the object model. First, if the state is encoded as a typical struct of common non-object languages, we have a breakdown of the programming model, intermixing object and non-object technology. If the state is encoded as an object, we have two different types of objects with very different characteristics: the state is a local, client-side object with no methods and no relationship with the server; the original service is an object with methods but no properties. To change the properties of the server object, the application has to make the changes to the local state object and then ship it back to the server by invoking a method like setState(theState). While the technique certainly works, it is not a clean or easily maintained programming model.

In addition, after the client-side state has been modified but not yet written back to the server, we have two inconsistent versions of the state, and processing logic would get different results depending on which version it accesses. Because of these limitations in shipping state, it is desirable to extend Object Request Brokers with services that handle state more efficiently.

Database Access Systems

There are a number of systems that provide remote access to database servers. Some of these systems include automatic cache management. When a record has been retrieved from the server, the application can retrieve values from the record again without requiring a re-fetch, and changes to the records are maintained in the cache and written back to the server all at once when a Commit operation is executed. Some such systems are based on object technology, in that they present the retrieved data in the form of objects in the application's programming language.

Such systems have a serious limitation in that they retrieve the objects to the client, but they cannot then invoke methods of the object on the server. Invoking methods of an object on the server would raise a difficulty for such systems once the object's state has been shipped to the client, that's where the object is maintained, its state may be modified on the client, and executing methods on the server may not be meaningful.

It should be noted that this problem also occurs with ordinary relational (SQL) databases, which commonly provide support for executing stored procedures. For example, if a record is retrieved to the client, then changes are made to that record in the client-side cache, and if those changes have not yet been written back to the server, and you now invoke a server-side stored procedure is invoked, the stored procedure would operate on the basis of incorrect data.

Because of these limitations in supporting distributed processing, it is desirable to extend database access systems with services that manage distributed processing more consistently.

Caching with Store Forward Technology

Cache Management

Cache management is a well-known technology: many systems, from database access tools to Web browsers, provide local caching of information to improve response time and reduce network traffic.

A read cache is used to keep copies of information that has been retrieved: if the application requests the same information again, it may be fetched from the cache. The cache may be transient, with information surviving only during the session, or it may be persistent, keeping information on disk between sessions or even when the computer is turned off. Of course, if the information is changed on the server, the cache may become stale. In some situations, such as web browsers, such staleness is acceptable, and responsibility for updating the information from the server rests on the user. In other cases, this is not acceptable, either because the information is more dynamic or because the application is more important. Asynchronous event notification of server-side changes is a proven technique for maintaining synchronicity among the elements of a distributed application. An application program can work with objects persistently stored in a database, and use caching for its well-known performance benefits. If another application elsewhere in the network changes a value of an object in the database, the system will send an event notification to the application, updating the value of the object. The value is updated in the cache, and an event notification is sent to the application so it can update the value in its calculation or on-screen.

A write cache is used to temporarily hold changes made to the data. When a client-side application makes changes to objects in its cache, those changes are held in the client-side write cache. Eventually, the changes are written through to the database server. As long as the client and server are connected, the changes are written through when a Commit operation is done in the application. Depending on the strategy of the cache manager and the concurrency control manager, changes may be written through earlier, but at a minimum the write-through is completed at the Commit time.

With a classical cache management system, both event notification (synchronizing changes from server to client) and cache write-through (synchronizing changes from client to server) operate effectively only as long as the client computer is connected to the database server. Such systems, however, cannot handle a situation when the connection has been lost. If the database server is not accessible at Commit time, changes cannot be written through and are lost. Similarly, any changes that occur in the database while the systems are disconnected would be lost, since no notifications can be sent to the client.

While an application can certainly respond to a failure exception by going into a pending state, waiting for the reestablishment of the connection so the commit operation can be completed, this is an unattractive solution for several reasons. First, it places the burden of handling such problems on the application developer. Correct handling of such outages is difficult, and it is unlikely that all application developers would have the skill or the budget to handle it correctly.

Second, the application is essentially stopped during this wait; with an uncompleted transaction pending, no other database operations can be done because they would become part of the same transaction, which violates the semantics of the application.

Further, if the application is shut down, intentionally or unintentionally, the pending state of the application is lost, and all the changes are likewise lost.

The systems may be disconnected for a number of reasons. There may be unplanned outages: network links may go down temporarily due to hardware or software failures, congestion or radio link interference. Such unplanned outages are more common today than in the past, because more systems operate in widely distributed configurations, communicating over unreliable dial-up or wireless links. There may also be planned outages: a laptop computer, for example, may be only intermittently connected, with a sales representative using the machine to quote prices to prospective clients, and only occasionally connecting to headquarters to download price changes.

In summary, while existing cache management systems are useful, it would be desirable to improve their behavior in the face of communications outages.

Event Notification

It might appear that the issue of data integrity would be moot if applications used conventional, pessimistic concurrency control, by locking objects in the database. If an application holds exclusive locks on objects, other applications cannot update them, so no notifications need be sent, and none need be queued. There are at least two practical arguments against this.

First, pessimistic concurrency control is not practical in a far-flung distributed environment, certainly not in one with intermittent connection. An organization cannot permit traveling salesmen to hold locks on objects in a database in headquarters-that would for example, prevent headquarters from changing prices. Experience suggest that the only practical concurrency control model in such widely distributed environments is optimistic, in which remote applications do not hold locks in the database and instead rely on event notification.

Second, regardless of the locking regimen, changes may be made on the server by method invocations initiated by the same application. Such side effects are then propagated out to the remote application using event notification. In some cases, with long-running methods, the connection may have been broken by the time the method is completed, and hence the event notifications need to be queued in a store-and-forward system.

While this scenario does not appear likely in a traditional transaction processing application, where server-side methods are short-running, today there are other application types that might have this need. For example, an application may keep track of the archival status of files on a disk, and the method invoked may be a backup job; after the completion of the backup job, the modified archival status flags should be sent to the application, and this may need to be queued since there is no need to interrupt the backup job just because a network link is temporarily interrupted.

Store-and-Forward Messaging Systems

Store-and-forward is another well-known technique, where messages that are sent to a computer location are stored in a queue temporarily if the destination computer is not available, and delivered as soon as a connection can be established.

Persistence by Reachability Technology

In some systems, object databases operate under a convention that when an object of a potentially persistent class is created in an application, it is still transient. The object becomes persistent only when explicitly saved through the execution of some specific method or statement.

In such systems, objects may also have references to one another. These references may be direct, so that an object has a property that contains a direct pointer or an address or path to another object. Alternatively, they may be indirect, so there is a third object that acts as the association or link between the two objects.

Such systems have at least one potential problem: a persistent object may have a dangling reference, a pointer to an object that was never saved and therefore does not exist when an application tries to recreate the object structure.

The common solution for this problem is automatic persistence through reachability also known as "transitive persistence". Systems that use this technique automatically navigate the references, finding all objects that are reachable from the persistent objects, and saving those as well.

However, such systems implement such persistence through reachability only within a single database. More complex application systems that accommodate objects from several databases, and that support relationships among objects in separate databases, do not provide automatic management of persistence.

Duplicate Object Resolution Technology

In any system that retrieves data from a database, there is the possibility of retrieving the same data twice. This is true in the simplest programs that read data from a file, and in programs that use ordinary relational tables. The possibility for double retrieval creates the possibility for an insidious program error, known as the lost update. Consider this example written in pseudo-code:

find one item based on some search criterion
    find another item based on some search criterion
    add 100 to some property of the first item
    add 200 to the same property of the second item
    save the first item
    save the second item If the two first statements were coincidentally to find the same item, we would expect to have both changes applied to the property of the same item, so the property was increased by 300, but in fact, that would not happen. The program has two copies of the original property. Let's say that the original value was 1000, for example. The third statement of the program would make the property 1100. The fourth statement would make the property 1200. The fifth statement would write 1100 to the database. The last statement would write 1200 to the database. In effect, the addition of 100 has been lost.

It should be noted that transaction management or concurrency control does not solve this problem, since the error occurs even when all these operations occur within the same transaction context. Concurrency control prevents separate programs from interfering, but it does not eliminate the possibility of errors in programming logic.

It could be argued that this is a straightforward error and one that the programmer should have tested for, noticing that the two original read operations indeed referred to the same object. This may be hard to do, however, because the object retrieval may be very indirect. We may have initially found two separate people, and then we locate the separate departments they work in, and then we locate the managers of the managers of those departments. It may not be obvious that we have now gotten to the same person through two different paths. Similarly, we may have retrieved an object in one part of the program, and then in a completely unrelated part of the program, perhaps written by a different programmer, we execute a query that retrieves several objects, one of which is the same one we already fetched.

Due to the complexity of the lost update problem, no existing database systems provide a solution. However, it is possible to solve the problem and reduce the possibility of lost updates with applicants' system.

Object Databases

While the potential problem occurs in all databases, indeed in all persistent stores, it appears more disturbing with an object database with a close language binding. Because such an object database appears to be at a higher level, because it presents the objects of the database as a vast ocean of objects in which the application can seamlessly navigate, errors such as lost updates due to object proxy duplication are more irritating. Simply, developers who use object databases expect more than users of the simpler relational databases.

Dynamic Concurrency Control Technology

In many cases, application programs require the classical attributes of concurrency control including atomicity, consistency, isolation and durability of operations performed on data retrieved from data sources. Many applications need to access both transactional and non-transactional data sources, and the disclosed system is designed to support all these providers.

Database systems have traditionally relied on locking to guarantee isolation of concurrently running transactions. The classical two-phase locking approach requires that a transaction lock a database resource and keep the lock until it is committed or aborted. This works well for applications that use a large number of short transactions.

Two-phase locking is less suitable for modern web-based applications that are characterized by longer transactions, lower transaction rates, and middle tier data caching. A long running transaction holding a lock on a popular database resource, e.g. the number of books in stock, could prevent all other transactions from running, thus paralyzing the entire web site. Therefore, recent years have seen increased interest in alternative concurrency control mechanisms. In particular, the optimistic concurrency control mechanism has been implemented in a number of database management systems and application servers.

Optimistic transactions consist of two distinct phases: a long-running read phase followed by a short write phase, also known as the commit phase. During the read phase, objects are retrieved without locking and placed into the private transaction cache where they can be modified without affecting other transactions. Objects are written back to the shared store during the commit phase. Instead of locking, an optimistic transaction relies on the assumption that no other transaction has modified the objects while it was running. This assumption is validated before changes made by the transaction are saved in the database. It is believed that optimistic concurrency control outperforms other methods in systems with low to moderate contention. The majority of today's e-commerce applications fit this profile.

Earlier implementations of the optimistic concurrency control mechanism were available as sub-components of larger database management systems. Very often, only data stored in these systems could be accessed in an optimistic fashion, without locking. This situation was in conflict with the trend towards information portals and transparent data access that emerged as a result of the increased use of the internet. Web sites are often built around data stored in legacy data sources such as relational and mainframe based databases.

Many of the modern application servers follow the traditional "star" architecture, as illustrated in FIG. 1. The web server and the application server processes are in the center of the star. They are connected to a number of web browsers and to several information providers. The application server is responsible for bringing data from the information providers to the web server clients. Data caching and optimistic transaction processing is also done in the middle tier where the application server is located.

This architecture is suitable for applications that have only web-based, or "thin", clients and for the ones that access only a limited number of back end information providers. At the same time, it is not optimal for applications with a mixture of both "thin" and "fat" clients. In such a setting, a "fat" client would need to access data residing in the cache of a remote application server, not much of an improvement compared to the traditional client/server architecture. In addition, bringing raw data from a large number of information providers to a single central location may have negative scalability implications when the data needs to be modified before it can be made available to the clients.

Accordingly, there is a need for a method and apparatus which more reliably maintains data integrity among distributed computer systems in a network.

Systems employing the disclosed technology, enable a network of distributed computer systems to maintain the integrity of data stored across the distributed computer systems. Use of the disclosed technology accomplishes this and other objects, features and advantages using several techniques, including:

State Shipping with Remote Function Invocation;
Caching with Store Forward Capability;
Persistence by Reachability;
Duplicate Object Resolution;
Distributed Methods; and
Dynamic Concurrency controls.

DETAILED DESCRIPTION OF THE INVENTION

Figure 1:
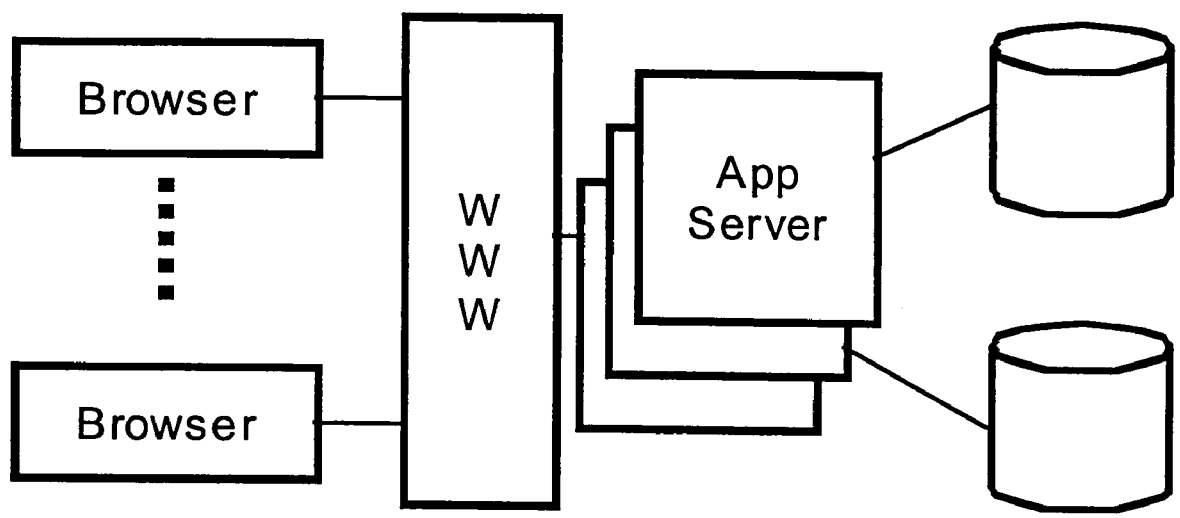
FIG. 1 shows a network having a star architecture consistent with certain prior art networks.

Applicants' system combines several known technologies in new ways, and adds new technologies, to address these problems of existing systems. Applicants' system addresses several specific problems, each through a particular combination of technologies. The system further also uniquely combines these services to provide a single infrastructure that supports service providers (methods without persistent storage), in addition to classical databases (persistent storage without methods) and object databases (persistent storage with methods).

Integrating services of different types without introducing integrity problems is quite difficult. Indeed, constructing a distributed application system is difficult in any case, because errors in program logic may be apparent only when the traffic patterns combine in an unfortunate way. Applicants' system introduces several methods that address these problems, thus reducing the difficulty of building a distributed application.

Constructing a distributed application system with good performance is also quite difficult. The way the entire application system is partitioned across the several computer systems, and the way the communication is structured, often requires careful fine-tuning. This is a difficult task for an application developer. Applicants' system reduces the burden on the developer by automating some of the performance tuning, and by making it easier to alter the partitioning and to tune the communications without extensive modification of the application's source code. Applicants' system removes many of these settings from the application and enables a system manager to optimize the behavior of the application system in a particular configuration, and to modify its behavior in response to changes in available technology, business requirements, distribution structure and load, without modifying the source code and with minimal risk of introducing errors.

Terminology

For the purposes of this specification certain terms will have the following definitions in addition to their common meanings a "provider" which is a software system that provides information or services. When the distinction is significant, the specification refer to an "information provider", a provider whose main function is the delivery of information, or to a "service provider", a provider whose main function is delivering a processing service of some sort. Information providers include classical, relational and object databases, directories, file systems, monitoring agents, the Internet, and other programs that provide data. Service providers include business applications, management tools, backup agents, and other programs.

The distinction between service and information providers however, is rarely rigorous; for example, most modern databases provide support for invoking stored procedures, and the Internet may be used to place an order as well as retrieving catalog data.

A "consumer" is a program that retrieves data, makes changes to data, stores data or invokes services. A consumer may be an application program of some sort, or a simple interactive tool such as a browser that allows a human being to interact with the information or services.

Similarly, the distinction between providers and consumers is not rigorous either. A single software component may be both a consumer and a provider at the same time. A provider may respond to requests, but in meeting those requests may act as a consumer, requesting other services from other providers.

In addition, the information flow between a consumer and a provider is not always structured as a classical request/response. A provider may send event notifications or other messages to a consumer, or to other providers.

The system provides services that allow software and hardware systems to communicate, whether they are located in the same process on one computer, in different processes on one computer, or on different computers; whether they act as consumers or providers, of information or services; whether they send or respond to requests, or send or react to events.

State Shipping combined with Remote Function Invocation

Applicants' system combines state shipping with remote method invocation. When an object is accessed, its state is shipped to the client and stored in the client-side cache, in the manner of present-art database access systems. This combination is accomplished under a rigorous object model, and the objects are exposed to the application as native objects in the application language, through a language binding. The state of the objects may be accessed directly, and these accesses are resolved locally from the cache. The state may be updated directly, and these changes are held locally in the cache, and written back to the server later under a lazy-write algorithm. The lazy-write algorithm may decide to do the write-through at various times, depending on the concurrency control model used and on optimization decisions, but at the very latest it is written when a Commit operation is invoked. Server-side methods are exposed through this language binding in the form of standard methods of the application programming language.

Pre- and Post-Method Synchronization

Since these methods execute on the server or on some other computer, in the case of distributed methods, the state should be synchronized between the client and server or other affected computers. Hence, when a server-side method is invoked, the cache manager writes through to the server all changes made to the state of the objects in the client application before the server-side method is actually invoked. Of course, such synchronization is not necessary when executing client-side methods.

It is possible to modify the logic of the state synchronization service of Applicants' system to optimize the amount of information written through. Some of the state changes may not be relevant to the method, and hence would not need to be written through at this time. However, in the general case, the state synchronization service cannot determine this, since the methods may be implemented in a multitude of languages and may be arbitrarily complex; therefore, to be on the safe side, it should write through all property changes. Of course, such manual control would be a possible variation of Applicants' system.

After the server-side method has been invoked, there may be a need to synchronize the client-side cache with the database. The method may have had side effects, modifying the state of the object it belongs to, or that of other objects that are also in the client's cache. Therefore, after a method invocation, the state synchronization service automatically synchronizes all objects in the cache that have been modified in the server.

Methods that access the database purely through the present infrastructure pose no problem. The infrastructure tracks all activity going on, determines what changes have been made, and can easily send notifications of all such changes up to the cache. If the methods access the database through direct techniques that the infrastructure cannot track, the infrastructure may be able to rely on event notifications from the database. Most database systems permit a program to register for notification on changes, through "triggers" or other techniques, and the infrastructure can use such notifications as the basis for cache synchronization.

If the infrastructure determines that neither technique is available it should take a pessimistic approach, invalidating and refreshing the entire cache. Note that in this case, no data is lost in the cache, since all pending changes will be written through before the method invocation.

Application Event Notification

Any such "side-effect" changes to objects that occur as a consequence of the method invocation are not only used to refresh the cache, but also passed back to the client-side application as regular change notifications, to permit the application to take the new value into account in its computation or to display it in the user interface. There is no fundamental difference between a change made by another program and a change caused by a side effect of a method: the application needs to be notified of both.

Transaction Management

Under classical pessimistic concurrency control, the application holds locks on records that it has read. In such cases, the entire discussion about pre- and post-method synchronization does not involve transaction management at all. The sequence of steps in the application looks like this:

```
begin pessimistic transaction
modify state in cache
...
automatic write-through of changes from cache
invoke server-side method
refresh cache from server
...
other operations
commit transaction
```

All of these operations work within the same pessimistic transaction context. The only unusual effect is that the application has to be prepared to deal with change notifications appearing due to method side effects. While under ordinary circumstances, an application operating under pessimistic concurrency control has not traditionally been concerned with change notifications on objects it controls, in today's complex, multi-threaded applications, some data held in one window or thread may be modified by another window or thread, so in reality any piece of code has to be prepared to accept change notifications on any piece of data that it shares with any other entity.

When operating in an optimistic concurrency control regime, however, the application holds no locks on objects in the database. Any time changes are written to the database, they are validated and immediately committed. Since any pending changes are written to the database before invoking the method, the method invocation automatically commits pending transactions. The consequences of a method invocation from the client application to the server are:

```
begin optimistic transaction
modify state in cache
...
send pending changes to the server
validate them against current state of the database
if validation failed
    send an exception to the client
else
    write changes to database
    invoke method
    commit transaction
    send event notifications to client,
        to refresh cache from server
...
other operations
commit transaction
```

Applicants' system offers another option, as discussed in detail with respect to Dynamic Concurrency Control. The transaction management services can switch over to pessimistic concurrency control when the method is invoked. These execution options may be selected as part of the configuration settings of the system.

Caching with Store Forward

Given the limitations of conventional systems, it may be desirable to have an infrastructure that can accept a transaction commit even when the connection is broken, and can maintain the transaction in a persistent store-and-forward queue, sending it through when the connection is reestablished.

Applicants' system uniquely combines these two capabilities, cache management and store and forward. With store-and-forward messaging feeding the cache management system, all notifications of server-side changes that occur during an outage are stored in a queue, and as soon as the connection is reestablished the changes are propagated and reflected in the cache and the application.

Similarly, notifications of client-side changes are also stored if necessary, and forwarded to the server as soon as the connection is reestablished. Since such asynchronous write-through to the server may have problematic interaction with concurrency control mechanisms, it may be disabled by the application program or by an administrative policy.

Application Transparency

An advantage of the integration of the present invention is that the application need not be aware of the intermittent synchronization process. The application may be written as if it had continuous and reliable access to the database, with the language bindings providing immediate access to a vast pool of objects. The cache improves the performance of the application, the store-and-forward queuing ensures that all changes are propagated to the application, all without any change in the style of programming in the application.

Resilience To Unplanned Outages

This integration of store-and-forward queuing with cache management increases the resilience of the entire system to short-term unplanned outages. Such an unplanned outage may be very short, especially with dial-up or wireless linkages. For example, a cellphone connection may be lost while a vehicle travels under a bridge, and re-established within seconds or minutes. The application and cache manager may continue to run during this outage. Yet, notifications from the server may be lost.

In practice, most network protocols would detect the lost connection and immediately signal the failure to the database server, which would then consider the whole operation lost. However, with the store-and-forward technique, the database server continues with its operation in the assurance that messages will get through eventually, and no failure messages are sent to the database.

Continually Running Applications

It is becoming increasingly common, for an application to be continually running while the connection to a database server is intermittent. Vehicles, ships and airplanes may have continually running applications dealing with inventory, dispatch or routing ultra-lightweight portable computing devices, including so-called Personal Digital Assistants, may run continually. In these cases, the cache may be kept alive continuously, and change notifications must be queued up while the connection is down.

Persistent Caching

The value of this integration of caching and store-and-forward is increased further when the cache is made persistent. Without a persistent cache, the benefits discussed above accrue only while the application, or at least the cache manager, is kept running. With a conventional, non-persistent cache, the values in the cache are discarded as soon as the cache manager is shut down. When it is restarted, the cache manager has to fetch the objects afresh from the database, and since those values of necessity reflect the current value, there is no need to queue up the change notifications that occurred in the meantime.

However, in many cases it is highly beneficial to use a persistent cache that is persisted onto local storage when the application or cache manager is shut down, and then recreated from the local store when the cache manager is restarted. In some cases, persisting the cache is the responsibility of the cache manager. In others cases, for example when operating on a laptop, it is the responsibility of the operating system.

Whatever component is responsible for persisting the cache, the situation is logically equivalent to a long-running cache, and store-and-forward queuing of change notifications is used to maintain the currency of the information in the cache.

Applicants' system may be contrasted with replicated database which can be configured to provide some similar benefits. Database replication schemes however, rely on database homogeneity, which means that an identical, or at least structurally and semantically similar, database be available at every node. On small computers, such as laptops or palmtops, this is not practical. In any case, Applicants' system provides these benefits with merely a persistent or non-persistent cache, which is a much useless burdensome technology than a database.

Persistence by Reachability

Applicants' system extends the concept of persistence through reachability across several information providers. Whenever the infrastructure decides that an object needs to be persisted, through the persistence-through-reachability algorithm or because the application program explicitly requested it to be persisted, it determines to which database provider the object is to be persisted. This may be determined through anyone of a number of techniques, including for example:

The class that the object belongs to may be associated with a schema defined in a particular database, and the object is to be stored in the same database The class that the object belongs to may have a particular database store specified, regardless of where the schema came from The class that the object belongs to, or the particular object, may have been associated with a particular store dynamically The system may decide which store to use based on some criteria of its own In these cases, the two objects that have a reachability relationship may be persisted to different databases. The relationship between them may be implemented through a reference that can accommodate different stores.

In these circumstances, the persistence by reachability algorithm relates in substantially the same way regardless of where the objects are to be stored. As long as the objects are held in the cache memory or in the application program's own memory, the relationships between the objects are known to the persistence infrastructure. The persistence by reachability aspect of Applicants' system navigates these references and makes its determinations which objects should be persisted in the conventional manner, by identifying all objects that are reachable from each persistent object, and marking them to be persisted. It then uses one of the techniques listed above to determine to which database the object should be persisted, and then effects the persistence in a conventional manner.

Duplicate Object Resolution

Applicants' system solves the problem of duplicate object resolution by automatically detecting when an operation would retrieve from the database an object that has already been activated or fetched from the server to the client. Since the system maintains in its cache all the objects that have been activated, whenever an object is fetched the system determines if the newly fetched object would duplicate an existing object in the cache, and if so, discards the new copy and instead uses the existing copy in the cache.

This technique applies whether the object is fetched from the database directly, by name; by following an inter-object relationship, an association or pointer from one object to another; by executing a query that returns a number of objects that match some specified criteria; by lookup in a list of recently visited objects; or by any other technique. How the object is arrived at does not matter; when it arrives, the system detects that it is a duplicate and discards the new copy.

Performance Improvement Variations

Of course, in many cases the system can detect that an object to be fetched already exists in the cache and eliminate the request to the database server altogether, thus reducing network traffic and database load, and improving response time. In other cases, such as when executing a query, utilizing the database cannot be avoided. In any case, these variations only affect performance, and do not alter the fundamental operation of the system.

Distributed Methods

An object database stores objects, and those objects have both properties and methods. The schema defines which methods exist for a given class of object.

In a conventional object database, the methods are implemented in the same object database. The definition of the method simply give its name and the class to which it belongs, and no further location specification is required since its location is implicit in the location of the object.

There are circumstances however, in which it might be necessary or desirable to implement a method somewhere else. For example:

The database may be less than completely capable. For example, if objects are stored in a relational database, the ability to execute methods may be limited. In such a case, the methods may be implemented as separate programs, perhaps executing on the same machine where the database is, perhaps executing on another one.

Given an object database with complete method execution capability, it may be desirable to replicate data to a less capable store. Replication is often done for reasons of improved availability, reduced network traffic and improved response time. However, if the replicated database does not provide support for method execution, the system may have to go back and execute methods in the original object database.

The objects that are stored in the database may represent physical pieces of equipment or software elsewhere in the system. Such an object,—a router, for example-may have capabilities implemented as programs that operate in the object itself; management services may provide functions that are implemented elsewhere; and the application may provide some functions that involve a graphical user interface and hence operate on the user's workstation. In all these cases, these services may be viewed as methods of the object, even though they may be implemented all over the network.

The methods of a class may be implemented in legacy programs or third-party programs over which the developer has little control. The methods may be implemented in different programming languages, databases or operating systems. Nonetheless, in order to simplify the use of these methods in application development, it is desirable to present these various methods as parts of one cohesive whole. It is of course possible to build a piece of software that ties together these separate method implementations, but building such a connecting service is a lot of work, and any change in configuration requires changes to the code. It is desirable to define and maintain the relationships externally, through administration of schemas, regardless of type and location of the methods.

Therefore, Applicants' system permits the schema to include definitions of methods that specify the location of the method, not just its name. During execution, the system permits an application to access an object in the database, and simply invoke a method on that object as if it were a standard, built-in method; the system will take care of dispatching the method invocation request to the appropriate location.

Method Implementation

The definition of a method should also specify how the method is implemented. It may be for example, a C or C++ DLL, invoked with a normal subroutine call. It may be a Java program, an executable program, or even a BAT file. The schema identifies which technology is used, and how the method should be invoked.

The method should also specify how the object is identified. When a method is implemented as an external program, it of course does not have the context of the original object. The method schema specifies how the invocation is to be done, in such a way that the context can be preserved.

Class and Instance Level Methods

The technique for handling external implementations of methods works equally well for instance-level methods that are attached to an object as for class-level methods that are attached to the class. When invoking an external method that is configured as an instance level method, the identity of the originating object is passed in to the method. The way this is done for example, the identify could be passed is specified in the schema, as part of the method definition as an argument in the call, as a command line parameter when launching an executable, or whatever is appropriate in the specific configuration.

Pre- and Post-Method Synchronization

As previously discussed, a system that combines remote method invocation with state shipping should take care of synchronizing the state between the client and the server before and after a method execution. In the case of distributed methods, this state synchronization should include the computer on which the method is to be executed.

This may be done in at least the following ways:

The state may be synchronized to the database that serves as the persistent store of the object. The method can then retrieve the state from the database before executing. During the execution of the method, the system writes any persistent state changes to the database. The client-side cache manager is notified of these state changes and uses them as the basis for post-method state synchronization. Note that if the method is running on a computer that already has a copy of the object in its cache, it may not need to fetch the object from the database.

The state may be synchronized to the cache of the server that is to execute the method.

Dynamic Concurrency Control

Applicants' system employs a unique dynamic concurrency control mechanism that is based on a combination of locking (pessimistic) and non-locking (optimistic) concurrency control strategies.

Each instance of the runtime system contains its own object cache and its own transaction manager. It may be run on a client machine where it can provide local data access for non-web based applications. Several instances of the runtime can be grouped together in the middle tier. There they can be accessed by the web clients and by other runtime instances. Automatic load balancing ensures improved scalability. A separate runtime instance can be placed close to a legacy database and used to perform object-to-relational mapping.

Objects are delivered to the middle tier in an assembled form, which reduces the number of network messages required to access the objects.

The architecture successfully resolves many non-trivial issues associated with transparent information access in a distributed environment.

Distributed Validation

All of the existing application servers and transparent data access frameworks perform validation of optimistic transactions in the middle tier, the place where the shared object cache and the private transaction caches are located. Validation is often done by comparing date stamps of objects in the private transaction cache against date stamps of the same objects in the shared cache. Validation fails if the stamps are different. Some systems perform validation by comparing before and after images of objects in different caches of the application server environment.

Figure 2:
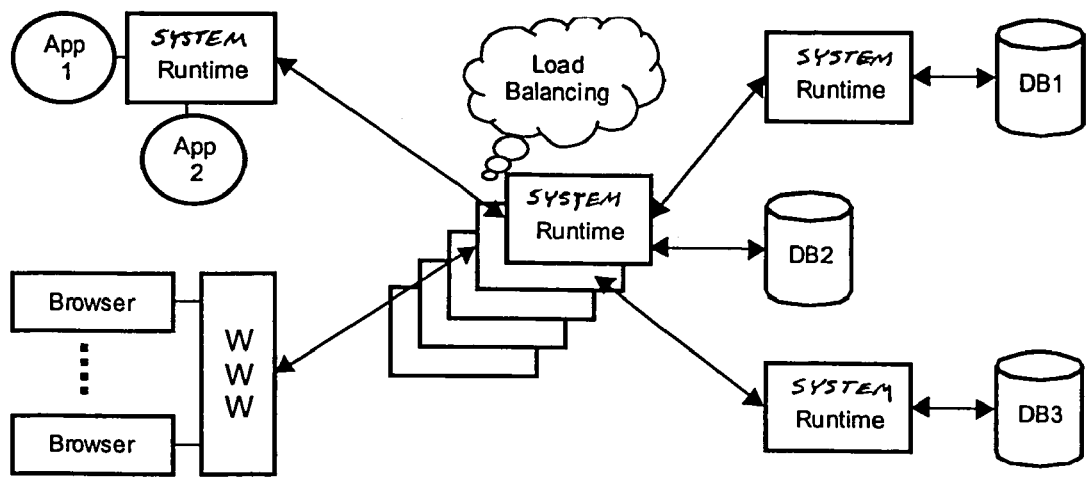
FIG. 2 shows a network having a distributed architecture consistent with the present invention.

An optimistic transaction may access data via a number of instances of the runtime system. For example, a transaction started by the application "App1" shown in FIG. 2 passes through at least three runtime instances when accessing data in the information provider "DB1".

In a preferred embodiment, each of the runtime instances maintains the read and the write sets of the transaction. When the transaction commits, its read set is compared with the write sets of transactions that have already committed. The transaction is aborted if a non-empty intersection of the sets is found in at least one of the runtime instances.

Provider-Specific Validation

In some cases, the rules for how a transaction should be validated may be specific to the application. For example, consider a database of employee records. If one application has changed a phone number of a record, other applications can be considered valid, unless they happen to modify the same phone number. But if the employee name is changed, the identity of any transaction that attempts to modify any part of the record is questionable, and any such transaction should be invalidated. This knowledge, that a phone number is insignificant but a name is significant, may be specific to the application.

Applicants' system allows the provider to take over the responsibility for transaction validation, by registering itself as capable of doing this, using the standard interface between providers and the runtime. If the provider claims this responsibility, the runtime system asks the provider to validate. The provider fails to validate the runtime it relies on its own, more conservative technique. In a configuration with several providers, while others may do their own, application-specific validation, some may defer the validation to the runtime system.

Parallel Validation

The read and write sets of a distributed transaction are partitioned across multiple instances of the runtime system. When the transaction commits, its validation is performed in parallel in all of the involved runtime instances. In an ideal case, when a transaction accesses N information sources via N different instances of the runtime running on N different CPUs, the validation can be up to N times faster compared to the time it would take if only one central application server was involved. Given the distributed nature of the enterprise wide data access, this case will be increasingly common.

Early Abort Prior to Validation

While an optimistic transaction is pending, other programs may modify the data that is used by the transaction-this is a fundamental principle of optimistic concurrency control. The conflicting modifications to the data are detected during the validation phase, using one of a number of techniques. This also is common in optimistic systems using Applicants' system. However, the event notification system can send notifications of any such conflicting changes to the runtime system, allowing it to abort the pending transaction early. This early abort feature reduces wasted effort by the human operator, who might otherwise expend effort entering data into a transaction that is eventually invalidated. This early abort feature also reduces wasted load on computers, networks and databases.

Early Abort During Distributed Validation

A long-running optimistic transaction need not wait until the end of its read phase in order to discover that it has been invalidated by another transaction. Once a committing transaction passes the validation phase, it compares its write set against the read sets of transactions that are currently active, and sends invalidation events to all transactions for which the intersection of the sets is not empty. The invalidation events are propagated via the distributed event manager that among other features is designed to provide guaranteed and in-order event delivery.

Hybrid Transactions

Systems supporting optimistic transaction management do so on a per-transaction basis. An application indicates the mode of a transaction when the transaction is started. A new transaction can be started in either pessimistic or optimistic mode.

The mode of a transaction can be different not only on a per-transaction but also on a per-provider basis. For example, an application may access two data stores: a private lightweight database used as the local persistent object cache, and a remote departmental database containing shared data. Applicants' system allows the application to access the local database in the pessimistic mode, thus avoiding the unnecessary validation overhead. The shared database can still be accessed in the non-locking optimistic mode.

This feature becomes particularly important when the invention is used to access non-transactional providers such as LDAP, ADSI, MAPI, and the NT file system. Optimistic concurrency control may provide isolation for transactions accessing such providers when serializability is required. It can also be disabled when it is not necessary.

Unique Wrapper API

Modern database systems provide varying degrees of support for optimistic transaction management. Unlike other transparent data access frameworks that insist on using their own algorithms for managing various phases of an optimistic transaction, Applicants' system is capable of leveraging unique capabilities of different information providers through development of customized wrappers. The wrapper API contains basic functions of the optimistic concurrency control that can be re-defined by the wrapper developers. This is not the case with the ODBC, JDBC, and OLE DB APIs used by other systems.

Dynamic Transactions

In Applicants' system, the state of an object (i.e., values of its properties) is shipped to the point where the object is used. The application "App1" shown in FIG. 2, for example, is accessing objects in the cache of the local runtime instance. This is a clear improvement compared to other systems that either leave the object on the server side or in the middle tier. Of course, when a server side object method needs to be invoked the state of the object is on the client and it may be required on the server in order to run the method.

Applicants' system accounts for this by enabling the transaction manager switch a transaction from an optimistic to the pessimistic mode dynamically while the transaction is running. The mode switch is performed transparently for the application at the moment when the application invokes a server side method. Only the provider that is used to run the method is affected. All other providers can continue running in the optimistic mode.

Note that the mode switch is only necessary if the provider itself does not support a form of optimistic concurrency control. Otherwise, the changes can be saved in the provider as part of the distributed optimistic transaction. For example, the mode of a distributed transaction is never changed when the state of an object is propagated among various instances of the runtime system. This feature is valuable for supporting plug-in service providers, such as the system's own catalog administrator.

Adaptive Transactions

Optimistic transactions are not suitable for applications with high contention on data items accessed by the clients. In such an application, a large number of optimistic transactions would not be able to pass the validation phase causing an unacceptably high rollback rate. While starting all transactions in the pessimistic mode is a straightforward solution to the problem generally used by other systems. It is too limiting in cases when the contention level changes over time. For example, in a real-world situation contention may be high between 8 a.m. and 6 p.m., and low during the rest of the time.

Applicants' system provides a solution to the problem is facilitated by the neural network agent technology. One example of this technology is more fully disclosed in U.S. patent application Ser. No. 09/084,620, which is incorporated herein by reference. Transactions are always started without explicit definition of their mode. When the contention is low, they are run in optimistic mode. When the rollback rate grows above a certain limit, the default mode is automatically changed to pessimistic. The rollback rate can be consistently kept within acceptable limits once the Neutral Agent accumulates sufficient knowledge to allow reliable prediction.

Session-Wide Event Notification Prior to Commit

The infrastructure of the Applicants' system extensively uses event notification, usually from providers to consumers. For example, a consumer may be notified that objects held in the client-side cache under optimistic concurrency management have been changed in the database, and hence the current transaction may need to be invalidated. Applications and providers can also send events to one another in a generic way.

In addition, it is common that the different elements that make up a client-side application need to communicate among one another. For example, a GUI application may consist of multiple windows, some running in the same thread, some running in different threads in the same process, some running in different processes.

Such different application elements may, for example, be presenting the same data item in different views or different contexts. Of course, once one application element makes a change and commits it to the provider, all applications interested in that object are notified of the change. However, within one client-side application, event notification must occur long before the change is committed. Of course, if all the application elements are part of the same process, they will share data through the common session and common cache. This leaves open considerations:

elements should be able to cooperate when they are in different processes? The user sees the different windows as part of the same application, and is not aware of or interested in configuration details, such as threads and processes. To the user, one application should present one set of data.

Regardless of how the data sharing is physically done, the various application elements such as GUIs, need to be notified when some data changes. This burden should not be born by the developer, because as the number of elements in the application grows, the number of notification relationships grows combinatorically. Whenever a new component is added to the application, other components that could potentially access the same data as the new component should be changed accordingly. This would be an expensive and effectively unmaintainable architecture for a developer. Instead, the infrastructure should provide a notification service that automatically sends notifications among components when some data changes, without waiting for a commit point, and without regard to thread and process boundaries. Of course, session boundaries are honored as it is fundamental to transaction management, that sessions are isolated from each other until changes are committed.

To address these issues, Applicants' system provides two facilities:

1. When an application component connects to the infrastructure, it can join an existing session.
2. Change event notifications are propagated within the session before the commit point, and without involving the provider.

Summary of Preferred Implementation

Hints

The object infrastructure is designed to offer significant advantages of reduced development effort, reduced programming errors and improved performance by transferring to the infrastructure many of the responsibilities that would ordinarily rest on the application programmer. This applies also to the work of developing graphical user interfaces (GUIs). Applicants' system enables a generic user interface to be built based on presenting the state of objects in forms, navigating associations between them, and presenting methods as entries on menus or as buttons.

Applicants' system provides a way for the database designer or application developer to guide the workings of the infrastructure through the definition of hints.

Isolating the Application From Implementation

The hints of the present invention not only provide direct advantages in improving the workings of the infrastructure or reducing the effort of the developer but also permit the developer to tune the behavior of an application without dropping down to a lower level of abstraction. By maintaining the programming conventions at a high level of abstraction, most of the advanced functionality of the system remains functional. Examples of such high-level functionality that might be undermined by explicit tuning at a lower level of abstraction include:

Cache management

Read-ahead

Write-behind

Duplicate object elimination

Through the use of hints, a developer or database designer can tune the behavior of the system without any explicit tuning-dependent statements in the application program. Advantageously, the system may be re-tuned in response to changes in the available hardware, distributed configuration, load patterns or other factors, without requiring any changes to the application.

Adapt to External Object Model

The general object management system of Applicants' system is capable of accommodating different kinds of information and service provides. Its general object model can be adapted to any system that meets the most minimal characteristics of an object system.

Using Applicants' system, a wrapper, an interfacing module for a provider, is written specifically to a provider, and can expose any number of special hints that describe the characteristics of the provider. Applications that are aware of the meaning of these hints can take full advantage of the advanced characteristics of the provider. Applications that do not know anything about the provider operate in the normal way, based on the standard object model. End of Comments.

Examples of Hints

Performance Tuning Hints: Many providers may specify hints that describe likely optimal ways to process information, given the semantics of the information:

- A projection list-a list of the properties that are most likely to be used by the application, and hence recommended to be included in any retrieval; or
- Frames used for read-ahead-a list of associations or other relationships to be used in grouping objects for read-ahead.

GUI Hints: A provider can specify hints that suggest how an automatic GUI generator should display the information for example:

- Grouping of properties onto tabs of a form;
- Whether an associated object should be displayed in a general navigation structure, such as a tree or network browser, or as a special page or tab on a form
- What default property should be used when an object is displayed;
- What property should be used as the name, caption, "tool tip" text, long description, help text, icon, 3-D representation, sound or video of an object;
- What entries should appear on a context menu for an object;
- How a GUI should handle navigation, such as entry of an object;
- How auto-layout techniques should arrange the contents of an object, under some specific association type;
- How numeric values should be formatted on display;
- What values are accepted on data entry; or
- How a drag-and-drop operation is to be interpreted.

Source of the Hints

Such hints may be provided by either the provider or by the consumer. Without any hints, the system will work in a standard way. Hints from either the provider or the consumer will guide the workings of various system services. If the various hints are in conflict, it is up to the service that uses these hints to decide what to do.

Open and Extensible

Hints are read and interpreted directly by the various services of the infrastructure, or by the provider, or by the application itself. Since hints are an official part of the infrastructure's data model, any component can create hints, and any component can use them. Further, since the entire infrastructure is open and extensible, any service may be replaced by another, perhaps one that uses another strategy for interpreting the hints.

Hints Never Cause a Failure

The object infrastructure defines the semantics of the operations it offers. The hints may give guidance to the infrastructure in how to optimize the operation, but they should not be allowed to be restrictive.

Semantically, hints are a form of side-band communication. They are not to be confused with regular object properties. Applicants' system maintains a distinction between hints and regular object properties. Consequently, the definition of new hints, or the deletion of some hints, is not like a change in the schema, and does not require a recompilation of the program.

Application Processing Hints

Since the hints are handled as a part of the data or metadata normally processed in the system, any component may define and use them. This means that the various parts of a distributed application can use hints to communicate about how processing is to be done. Using an agreed-upon message convention, a provider can direct a GUI component to bring up related objects and analyze the structure of the relationship.

Such special codes utilized in existing application systems, often requires complicated special techniques of sideband communication. These special codes have to be maintained. For example, if the system is to be switched over from SNA to TCP/IP, the main database access protocol has to be ported, and the sideband messaging protocol has to be ported as well. With the application processing hint facility of Applicants' system, the special hints are logically in a sideband, outside of the normal database access traffic, but technically they are part of the mainstream protocol and require no special care or maintenance.

Undo

Undo Support in the Cache Manager

In Applicants' system, the system maintains a cache of all the objects that have been fetched from the database. Any time a change is made to the database, the new values are written into the cache.

An undo management facility is added to the cache manager. This service records every change in an undo queue. For typical changes to a property value, the undo queue simply records the previous value. For lifetime changes such as creation or destruction of objects, the undo queue records the equivalent operation that would revert that operation: delete for create, create for delete. In practice, the operations that would revert a change may be very complex: for example, if a class is deleted, all instance of that class, all subclasses, all instance of all subclasses, all methods and other facilities of those classes are also deleted. The undo manager stores the inverse operations required whenever possible. In some cases an undo operation may not be possible or practical, and in those cases the appropriate notation is stored in the undo queue.

The undo manager also provides undo and redo functions that the application can directly invoke, as well as support services useful to a GUI, such as listing the sequence of operations in the undo queue in human-readable form.

Undo and Transaction Management

It should be noted that this undo capability cannot be effectively provided by the rollback capability of database transaction management systems. Database rollback is by far too expensive an operation to be connected to a trial-and-error user operation available through a mouse click. In addition, no database transaction system provides redo, and very few provide multiple undo.

Once a set of operations have been committed in a transaction, it may be problematic to undo the individual steps of the transaction. For example, if the user wants to transfer money from one account to another, and this is done as one transaction consisting of one subtract and one add operation, it would be problematic to undo the individual steps of that operation. Therefore, typically a Commit operation consolidates the undo queue, collapsing all the operations in the current transaction into one undo-able operation. In some cases, a specific counter-operation may be known for a specific operation: for a particular method may be specified, in the database schema, the corresponding counter-method. In others, the transaction may not be undoable at all. However, the details of how a transaction is handled may be modified in any particular implementation of the system.

Non-Stack Undo Model

The common approach to undo operations is a stack model: actions must be undone in the reverse order they were made, and redone in the order they were made. In principle, however, there is nothing to prevent individual actions to be undone in arbitrary sequence. Random access undo operations are in principle possible, and in some cases quite useful.

Such random access undo is often rejected in the current state of the art, because in many cases it may not be possible. For example, if operation 6 in the queue creates an object, and operation 11 modifies a property of that object, then undoing operation 6 alone would not be possible because it would invalidate operation 11. But such a simplistic interpretation is not the only one possible. It is possible to permit random-access undo, if the inter-dependencies of the actions is maintained. In this example, undoing action 6 would automatically undo action 11, but if action 7 has no relationship with action 11 or with any other operation in the queue it can be undone by itself.

Such random-access undo is quite useful in many of the complex applications that are increasingly common. In classical online transaction processing, the sequence of operations is often quite simplistic and the benefit of random-access undo is limited, but in a more complex, knowledge-intensive application it is quite useful.

Schema Tolerance

In a theoretical, ideal situation, all related objects would be stored in a single database, managed under a single schema. Existing systems, however employ several distributed databases in these cases, a consistent schema is assumed, but in reality schema consistency may be hard to achieve. For technical, economic, practical and administrative reasons, information may be stored in databases under inconsistent schemas. For example, after a business is acquired, much of its information may need to be kept in existing databases that don't match the acquirer's schema. For example, a U.S. company that acquires a Venezuelan or Russian organization will have to deal with the different definitions of a name: given name, family name, mother's family name in Venezuela, given name, patronymic, family name in Russia.

Applicants' system accommodates such schema inconsistencies and permits the application from navigating seamlessly between the different databases. Consider this example:

```
Object boss = Employee.find(. . .)
Collection staff = boss.getAssociatedItems("reports")
For each emp in staff
   . . .
next emp
```

If the initial object, the boss, is stored in database A under a particular schema, the employees that make up the staff may be in another database, B, under a different schema. Indeed, some employees may be stored in A and some in B. The system hides this distinction, permitting the application to retrieve the objects and access their properties and methods regardless of where they are stored:

```
Object boss = Employee.find(. . .)
Collection staff = boss.getAssociatedItems("reports")
For each emp in staff
   Name = emp.FamilyName
next emp
```

If the distinction between the two databases is significant, the application can interrogate the object, find out its location, and adapt itself to the specific schema, for example retrieving the patronymic when one exists.

Associations Among Entities

Abstract Associations

Applicants' system abstracts the concept of relationships among entities as an association. Such an association is defined as part of the schema, and an application program can the services of the invention to navigate the association. Because the definition is abstract, removed from the physical implementation, a provider can use whatever technique it wants for maintaining such relationships, such as foreign keys in a relational database, object references in an object database, methods that execute queries, as long as they are exposed in a manner consistent with the semantics of an association.

Once the relationship is presented as an association, the application can easily navigate this relationship. The associated objects simply appear as related objects in the application programming language. The application code might look like this pseudo-code:

```
Object boss = Employee.find(. . .)
Collection staff = boss.getAssociatedItems("reports")
For each emp in staff
   . . .
next emp
```

An association is an abstract concept that provides a bi-directional reference between two entities.

In most cases, the entities that are associated are objects, but the concept is not limited to objects. Associations can exist between any pair of entities that have a globally unique name, such as e.g. a file with a path, a web page with a URL, an object with a UUID. For example, association from a property of a class can be assigned to a validation method or visualization service for that property.

An association can also have additional properties of its own, such as the inception date. A program, such as perhaps a database administration tool used by a human can define types of associations, and create individual associations among the named entities. The program can also navigate using these associations, retrieving either the associated entities or the associations themselves. The associated entities are automatically fetched as they are needed: the association is automatically de-referenced as the application navigates over the set of associated entities.

This automatic de-referencing is made efficient through automatic optimization and self-tuning techniques, for example:

The system does not fetch all of the objects immediately, on the getAssociatedItems statement. A lazy fetch is used, fetching objects from the database as they are needed The lazy fetch is not done for each object as it is needed. The lazy fetch manager fetches objects in batches.

The system is self-tuning, adapting the size of the batch to the observed performance of the environment. Rapid turnaround causes batch size to be increased. Slow turnaround causes batch size to be decreased. More complex tuning algorithms can of course be inserted here.

The performance tuning subsystem also permits the developer to provide hints, guiding the system in its tuning.

Association Registry

The various implementations that may be used for associations, such as objects with references, tables with foreign keys, methods or queries, may be used directly for navigation, without any further specification or metadata. For example, consider a class called Containment used to implement an association. It holds two references to the container object and the contained item:

```
class Containment{
    object container
    object containeditem
}
```

Such a class can be directly used for navigation by programming something like this:

```
Object cont = ...
Collection contents = cont.getAssociatedItems(
    "Containment", "container", "containeditem")
```

The last statement tells the system to look for objects of the class Containment, using the property named container to find references to the current object (referenced by cont), and then find all objects referenced by the property contained item.

The class Containment is not special in any way, it is just a regular class. (This is similar to the way you do joins in SQL, using a regular table without any special characteristics.)

However, the present invention makes this concept more general by allowing the Containment class to be registered in the association registry. This tells the infrastructure that this class is normally used as an association, but it does not limit the use of the class in any other way.

Similar registration can be made for other types of associations, including but not limited to: A pair of direct object-to-object references (for a 1-to-1 association); Collections of object-to-object references (for 1-to-N and N-to-N associations) and Search methods that retrieve logically associated objects.

The association registry offers numerous benefits, including for example:

- Consumer applications do not need to know the implementation model used by a specific provider; they simply reference the abstract concept of associations, and the infrastructure translates that reference into the appropriate operations given the specific implementation of the association
- Separating the application from the implementation of the association makes it more resilient to changes in the provider's data model, and more able to accommodate replacement of a database provider with another one of very different type
- General tools that do not know anything about the application-level schema of the provider can find out which types of associations exist, using the association registry for introspection; this is particularly useful for graphical browsers
- When generating the Layer 2 model, the Layer 2 generator can create virtual properties based on the registered association types; in the example above, we can register the association through the Containment class under the name contents, and this permits the Layer 2 code generator to create a virtual property contents for the Container class, giving applications an easier way to navigate the associations References to External Objects The associations between objects may reference information stored in external providers. For example, the boss in the previous example could be stored database A, and the staff in database B.

The automatic navigation of associations, and the automatic de-referencing of the objects, completely hides this distinction from the application. The application can navigate between these objects, going from one to the other, without concern for where the objects are located.

Indeed, since the architecture of the system hides the nature of the providers from the application, it is possible for such external references to point to any type of data source; including but not limited to data in a non-object database, a person in a directory, a file or, a page on the Internet.

Associations Stored Externally

In many cases, an application may use existing database providers whose schema cannot change.

In such instances, it may be desirable to maintain relationships between these objects in these providers. As a practical example, information may be stored in the databases of a commercial financial management system, which references people or departments, and it may be desirable to link those references to the corresponding entries in a directory. This linking would allow an application to be built that reacts to data in the database and makes decisions based on the organizational data in the directory, perhaps sending email.

However, if neither the database or the directory can be changed, it may not be possible to store the association and do a straightforward join between the databases. Applicants' system permits the storage of such associations in other databases. Thus, two databases that don't reference each other, and cannot be made to reference each other, can nonetheless be linked.

In Applicants' system, the application navigates the associations in the standard way, the only thing it has to do is specify where the association is stored when it names the association to be used for the navigation. Even this minor inconvenience can be eliminated by registering the association in a registry. This way, the association may be mentioned by name in the standard way, and the system looks it up in the registry, finds where it is actually stored, goes to the external association store to get the link, and then follows the link to the other object.

External Loopback Associations

This same technique can be used to store associations that reference objects within a single database, in those situations when the schema cannot be changed to accomrilodate direct storage of the associations.

Language Bindings

Applicants' system exposes its services through an Application Programming Interface (API) that is available in common programming languages including Java, C++ and any language that supports COM, including Visual Basic.

Layer 1 Language Binding

Every system for accessing information providers or service providers uses a core data model. In SQL-based systems such as ODBC and JDBC, the data model is tables with atomic elements in the cells, extended with stored procedures. In ORBs, the data model is interfaces, essentially a specification for a procedure call. The choice of data model is an essential part of every design, because it embodies some tradeoffs:

If the data model is primitive, it limits the capabilities of the system (e.g. SQL)

If the data model is rich, it demands a lot of capabilities of the providers it works with and makes it cumbersome to connect primitive providers (e.g. Java RMI)

If the data model is very specific, it cannot be adapted to accommodate different designs (e.g. Microsoft WMI)

If the data model is very general, it provides a low level of services and leaves all semantic intelligence to the application (e.g. LISP)

The present object model begins with something called an item, then proceeds to define collections of items, introduces the notion of item names, and, finally, named collections and item ownership. In this way, a compact and elegant foundation is built for a self-descriptive data format that can be used to store, move and reference data. This data model is called Layer 0.

This format is built upon to define higher level concepts such as classes and objects, properties and methods (Layer 1), and then on top of that build specific classes such as computers and employees (Layer 2). The unique advantages of this design are:

The basic data model (Layer 0) is simple enough that it can accommodate any existing system, without imposing any requirements on an object model.

Because the higher level model (Layer 1) is based on the simple Layer 0 model, it can provide a more modern object model and richer semantics for those providers that present such capabilities, without demanding it of simpler providers.

The implementation of the Layer 1 binding is based on dynamic processing, and is therefore tolerant of inconsistencies and change. If a provider changes its data model, for example if a database schema is modified, the Layer 0 model automatically accommodates the change, and the Layer 1 model does so as well. Applications that use the provider do not require change or recompilation, and do not fail if they do not have to. Specifically, added capabilities can be simply ignored if the application is not interested, but if the application uses the services of Applicants' system to do introspection it can find out about the new capabilities and exploit them. Capabilities that are removed have no impact on applications that do not use those capabilities. Even if an application attempts to use a capability that has been removed, it simply gets an exception message and can attempt to recover.

Layer 2 Proxy Binding

Problem: Resilience vs. Assurance

When constructing and maintaining a large application system, especially one that includes previously existing elements or elements that come from other application systems, maintaining the consistency of the entire system is challenging. The term Configuration Management (or simpler, Version Management) refers to the activity of ensuring that the various elements of the system are compatible, so they can interoperate, and consistent, so they work from the same assumptions. In existing systems, configuration management is commonly viewed as a build-time activity.

In Applicants' system, configuration management is a runtime activity: the elements of the system should be to communicate, to negotiate and agree on a common version; each element should be resilient and should be able to continue to operate even when a correspondent is inconsistent.

In existing systems, such resilience is sometimes achieved through dynamic interfaces, often called late binding. A late-bound system, such as the IDispatch-based interfaces of COM, is able to adapt to whatever interface an element exposes.

However, making a software system entirely late-bound is often unattractive, because it eliminates the possibility of validating the consistency of the configuration at compile time, with early binding. Compile-time validation permits a level of assurance that is never achievable with late-bound systems since run-time testing can never be shown to be exhaustive.

Applicants' system combines the resilience of late binding and the assurance of early binding.

Problem: Resilience vs. Convenience

Dynamic interfaces allow a consumer to adapt itself the specification of a provider, by interrogating the provider through introspection and reflection services. Such services are commonly provided in component architectures such as COM, and in database access services such as ODBC and embedded SQL.

The benefits of these system come at a high price. Programming to these interfaces is quite cumbersome and error-prone. To lessen the burden on application developers, we would prefer an interface that exposes the data model of the business application is preferable, integrating it directly in the programming environment. This is particularly attractive with modern object-oriented languages such as C++, Java and Visual Basic, which directly support relatively rich semantic models.

The Solution

In existing systems, the benefits of these two approaches are never available at the same time. Early-bound systems such as COM do not provide the resilience or flexibility of late binding. Flexible systems such as dynamic SQL do not provide the assurance and convenience of early binding.

Applicants' system combines these benefits through a high-level language binding. The Layer 2 proxy binding exposes objects available in information providers in the form of native classes in a specified programming language. A developer defines the schema in the database, and then uses that schema in the application language: the proxy binding is data provider centric.

This type of binding provides several advantages over the Layer 1 binding, without sacrificing its core advantages.

The flexibility of the Layer 1 binding, and its ability to dynamically accommodate any provider through introspection entails a heavy burden on the developer. The Layer 2 binding presents the developer with the semantic constructs of the application domain, reducing the development and maintenance effort.

The dynamic adaptability of Layer 1, namely the capability to accommodate changes to provider schemas, makes it difficult to validate consistency between consumers and providers at compile time. The Layer 2 binding generates classes in the target programming language or infrastructure, and these classes can be used for compile-time validation.

At the same time, since the Layer 2 binding is implemented on top of Layer 1, it is capable of dynamic accommodation just like any Layer 1 application. Hence, an existing application over which the developer has no control, because of remote deployment, administrative barriers or cost considerations can continue to operate with the resilience of Layer 1. Applications that deserve compile-time validation can be run through the standard Layer 2 validation process.

Unified Proxy and Persistence Bindings
Problem: Limits of Persistence Bindings
Unified Bindings In Applicants' system, the Layer 2 persistence and proxy bindings are unified into an integrated whole, thus reducing the risk of inconsistency.

A developer can define the initial schema either in the application program or in the database tool. A utility migrates the schema definition from one environment to the other. If the original definition was the application program, a database schema is constructed and installed in the database. If the initial definition was the database, source code is generated for use in the application program. The developer can then refine the definition in either location; for example, by adding indexing and clustering definitions, modifying the properties and their types and attributes, adding or modifying server or client side methods. The utilities of Applicants' system keep the two environments synchronized, translating the definition from one language to another.

Aspects of the Invention

This unification is achieved through these characteristics of the invention:
  The syntax of the application program is identical for the two language bindings (the proxy and persistence models);
  The database schema is identical for the two binding models;
  Applications in both models use the same runtime support library;
  Application in both models have the same semantics;
  The code generator used in the proxy model generates code that is compatible with the persistence model preprocessor;
  The schema generator and code generator used in the persistence model generate schema and code that are compatible with the proxy system; and
  Both code preprocessors and code generators accept and preserve user extensions.

Benefits

This unification offers at least two very important advantages:

First, unified bindings support iterative development. Accordingly, a developer can use the two models iteratively, moving back and forth between the two ways of working. Second, unified bindings provide pedagogical unity, limiting an application to a single source code model making the system easier to learn.

While the best mode for carrying out the invention has been described in detail, those familiar with the art to which the invention relates will recognize various alternative designs and embodiments for practicing the invention. These alternative embodiments are within the scope of the present invention.

What is claimed is:

1. A method for maintaining the integrity of data stored throughout a distributed computer system, the method comprising:
   identifying an object to be persisted;
   determining a selected one of a plurality of database providers for persistently storing the object, the selected database provider selected based on a schema associated with a database of the selected database provider; and
   storing the object with the selected database provider.

2. The method of claim 1, wherein the step of determining includes the step of selecting the database provider based on an association with a schema defined in a database maintained by the database provider.

3. The method of claim 1, wherein the step of determining includes the step of selecting the database provider based on a database associated with the class to which the object belongs.

4. The method of claim 1, wherein the step of determining includes the step of selecting the database provider based on a dynamic association of a database to the class to which the object belongs.

5. The method of claim 1, wherein the plurality of database providers provide a plurality of databases having database schemas that are inconsistent with each other.

6. The method of claim 1, further comprising creating a reachability relationship between the object and at least one other object, the at least one other object stored with another one of the plurality of database providers, the reachability relationship accommodating a first schema of the selected database provider and a second schema of the other one of the plurality of database providers.

7. The method of claim 1, further comprising:
   identifying at least one additional object that has a reachability relationship with the object; and
   marking the additional object for persistent storage.

8. A system for maintaining the integrity of data stored throughout a distributed computer system, the system comprising:
   a plurality of databases provided by a plurality of information providers;
   a processor in communication with the plurality of databases, the processor operable to:
      identify an object to be persisted;
      determine a selected one of a plurality of database providers for persistently storing the object, the selected database provider selected based on a schema associated with a database of the selected database provider; and
      store the object with the selected database provider.

9. The system of claim 8, wherein the processor is further operable to determine the selected database provider based on an association with a schema defined in a database maintained by the database provider.

10. The system of claim 8, wherein the processor is further operable to determine the selected database provider based on a database associated with the class to which the object belongs.

11. The system of claim 8, wherein the processor is further operable to determine the selected database provider based on a dynamic association of a database to the class to which the object belongs.

12. The system of claim 8, wherein the plurality of databases have a plurality of associated database schemas that are inconsistent with each other.

13. The system of claim 8, wherein the processor is further operable to:
   create a reachability relationship between the object and at least one other object, the at least one other object stored with another one of the plurality of database providers, the reachability relationship accommodating a first schema of the selected database provider and a second schema of the other one of the plurality of database providers.

14. The system of claim 8, wherein the processor is further operable to:
   identify at least one additional object that has a reachability relationship with the object; and
   mark the additional object for persistent storage.

15. Software for maintaining the integrity of data stored throughout a distributed computer system, the software comprising a program of instructions encoded on the computer-readable medium, the program of instructions operable when executed by a processor to:

identify an object to be persisted;

determine a selected one of a plurality of database providers for persistently storing the object, the selected database provider selected based on a schema associated with a database of the selected database provider; and store the object with the selected database provider.

16. The software of claim 15, further operable to determine the selected database provider based on an association with a schema defined in a database maintained by the database provider.

17. The software of claim 15, further operable to determine the selected database provider based on a database associated with the class to which the object belongs.

18. The software of claim 15, further operable to determine the selected database provider based on a dynamic association of a database to the class to which the object belongs.

19. The software of claim 15, wherein the plurality of databases have a plurality of associated database schemas that are inconsistent with each other.

20. The software of claim 15, further operable to:

create a reachability relationship between the object and at least one other object, the at least one other object stored with another one of the plurality of database providers, the reachability relationship accommodating a first schema of the selected database provider and a second schema of the other one of the plurality of database providers.

21. The software of claim 15, further operable to:

identify at least one additional object that has a reachability relationship with the object; and mark the additional object for persistent storage.

* * * * *